United States Patent Office 3,040,098
Patented June 19, 1962

3,040,098
SULFUR-NITROGEN POLYMER DERIVED FROM SULFUR DICHLORIDE AND MONOMETHYLAMINE
Bobbie D. Stone, Dayton, Ohio, assignor to Monsanto Chemical Company, St. Louis, Mo., a corporation of Delaware
No Drawing. Filed Dec. 17, 1956, Ser. No. 628,479
4 Claims. (Cl. 260—583)

The present invention relates to polymers containing sulfur and nitrogen and also to the method of preparing such polymers.

An object of the present invention is to prepare linear polymers having the structure:

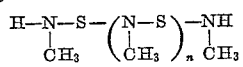

where $n$ is an integer having a value of at least 4. Another object of the invention is to prepare a rubber accelerator and anti-degradent. Still another object of the invention is the preparation of said polymers by the reaction of sulfur dichloride with monomethylamine.

In the vulcanization and heat treatment of rubber, it is often desirable to employ chemical accelerators which contain nitrogen and sulfur. However, such compounds are often unstable so that they cannot be stored without decomposing into undesirable and useless products. An example of such an unstable composition is the reaction product of sulfur dichloride with ethylamine which occurs as a cyclic tetramer. This cyclic compound decomposes spontaneously at room temperature and will shatter glass bottles in which it is stored.

It has now been found that stable linear polymers may be prepared by reacting sulfur dichloride with monomethylamine. The polymers have a molecular weight corresponding to 6 or more nitrogen atoms disposed in a linear chain, and may be prepared in higher molecular weight forms having up to 500 or more nitrogen atoms in the linear chain.

The production of linear polymers by the reaction of sulfur dichloride with monomethylamine is unexpected since the product obtained by reacting sulfur dichloride with ethylamine, as has been pointed out above, is a cyclic tetramer. It has also been found that higher alkylamines, such as monobutylamine, when reacted with sulfur dichloride do not give the desired linear polymers.

In order to obtain high molecular polymers from sulfur dichloride and monomethylamine, it is desirable that the two reactants be employed in equal molar proportions. However, since hydrogen chloride is evolved in the course of the reaction, it is also necessary to have a hydrogen chloride acceptor or scavenger present in order to combine with the hydrogen chloride so as to allow the reaction to continue with the production of polymer. Such hydrogen chloride acceptors may be various unsaturated hydrocarbons and tertiary amines, for example, pyridine, trimethylamine and other strongly basic tertiary amines. An excess of monomethylamine may similarly be employed as the hydrogen chloride acceptor. In this event it is desirable to employ a molar ratio of at least three moles of monomethylamine to one mole of sulfur dichloride. When an amount of the amine in excess of a molar ratio of 3 to 1 of the sulfur dichloride is employed, there is a tendency to obtain polymers of lower molecular weight.

Lower molecular weight polymers may also be obtained by the use of a chain stopper, such as dimethylamine or other secondary amines. Thus, the above reaction between sulfur dichloride and monomethylamine may be modified by using a mixture of amines consisting of 16.7% dimethylamine and 83.3% monomethylamine. The polymer obtained in this case has about 6 nitrogen atoms in the linear chain.

The reaction time is not critical, since the two reactants apparently form the polymer with great rapidity. The limiting factor in adding the two reactants is the removal of the exothermic heat of reaction.

The preparation of the polymer from sulfur dichloride and monomethylamine may be conducted over a wide temperature range, such as from −80° C. to 40° C. A preferred temperature range is from −80° to 10° C. A solvent which is inert to the reactants, such as any liquid, which remains liquid at the reaction temperature, for example, benzene, hexane, ether, etc., may be employed to facilitate the reaction, but it is not essential hat a solvent be used. The chief advantage of a solvent is to aid in removing the heat of reaction, so that the cooling system can keep the temperature of the reaction mixture within reasonable limits.

The preparation of the polymers of the present invention may be carried out by passing monomethylamine into a solution of sulfur dichloride, and isolating the resulting product. Another method of conducting the reaction is to flow streams of the monomethylamine and the sulfur dichloride simultaneously into a reaction vessel from which the polymer may then be removed continuously, or at periodic intervals.

The polymers of the present invention may be used in the production of fibers, and as insecticides and rubber chemicals.

The invention is illustrated by the following examples:

Example 1

One hundred grams (0.972 mole) of sulfur dichloride are dissolved in hexane. The solution is cooled to 0° C. and a slow stream of gaseous monomethylamine is added to the cooled mixture at atmospheric pressure. About 100 g. (3.24 moles) of the monomethylamine are added while the temperature is maintained at 0° C. during the reaction period of about one half hour. It is found that a yellow reaction product is formed in the reaction vessel. This reaction product is separated from the hexane by decantation. The reaction product together with precipitated monomethylamine hydrochloride is extracted with alcohol to remove the monomethylamine hydrochloride. The remaining material is purified by redissolving in chloroform and precipitating the polymer by addition of alcohol. The purified polymer thus obtained is a putty-like, brown material which can be drawn into filaments by slow movement, but is shattered into many small pieces when drawn suddenly. A molecular weight determination shows that the product has a molecular weight of about 600 corresponding to 10 nitrogen atoms in the linear polymer chain. This polymer has a softening point of 65–70° C. The analysis of the product is as follows:

Calculated for:

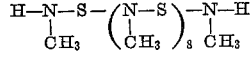

C, 20.68; H, 5.52; S, 49.70; N, 24.10. Found: C, 21.99; H, 5.07; S, 48.02; N, 17.32.

The linear nature of the present polymeric composition is indicated by an end group titration and by the magnitude of the molecular weight obtained by specific viscosity measurements.

Example 2

Sulfur dichloride is first distilled in order to remove impurities, after which 21.63 g. (0.210) mole) of the purified material is dissolved in 500 ml. of hexane and the solution cooled to −10° C. A slow stream of purified monomethylamine (19.57 g.; 0.630 mole) is passed into the mixture, while cooling to −10° C. The reaction time is about 30 minutes. The product is worked up as described in Example 1 to yield a polymer which is a brittle solid, softening at 135–140° C. The polymer obtained is considerably higher in molecular weight in comparison to that of Example 1.

*Example 3*

The use of the polymer of Example 1 as a vulcanization accelerator and anti-degradant for Butyl rubber formulated with carbon black is shown in the present example. The Butyl rubber is first mixed in a Banbury mixer for 10 minutes at 300° F., after which the carbon black, polymer and fluxing agent are added in the proportions shown below, and further mixing is carried out in the Banbury mixer for 10 minutes at 300° F. The Banbury charge is then dumped and the final compounding is carried out on a rubber miller at 122° F. utilizing the compounding ingredients set forth below. Curing of the Butyl rubber in order to vulcanize the mixture is carried out in molds utilizing a steam pressure of 45 lbs. and a temperature of 291° F. In the formula below the parts are by weight.

Master batch ingredients:
  Butyl rubber _____ 100
  Polymer of Example 1 _____ 0.5
  Carbon black _____ 15
  Asphaltic hydrocarbon fluxing agent _____ 35
Compounding ingredients:
  Zinc oxide _____ 5
  2-benzothiazyl disulfide _____ 1
  Tetramethyl-thiuram disulfide _____ 1
  Sulfur _____ 2

The vulcanizates obtained show that improved vulcanization is obtained in the use of the above-described polymer having the general formula, in which $n$ is an integer having a value of at least 4:

and results in an accelerated vulcanization and a decreased degree of degradation which is normally inherent in the vulcanization process.

The linear polymers of the present invention having 6 or more nitrogen atoms in the linear polymeric structure may be utilized in processing sulfur with various types of vulcanizable rubbers including natural rubber and also synthetic, unsaturated rubbery elastomers such as butadiene, butadiene-styrene and butadiene-acrylonitrile polymers. Another group of synthetic rubbery materials which are advantageously vulcanized with the present composition are the copolymers of at least 85% isobutylene and a minor amount of a conjugated diene hydrocarbon such as butadiene. The proportion of the said linear polymer having the general formula; in which $n$ is an integer having a value of at least 4:

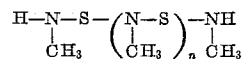

employed in the vulcanizing or heat processing of rubbers is from 0.1 to 3.0 parts of the polymer per 100 parts of the rubbery elastomer or natural rubber. The vulcanization temperature is not critical but may be in the range of 250° F. to 370° F.

What is claimed is:

1. The process of producing a polymer containing sulfur and nitrogen which comprises contacting sulfur dichloride with at least a stoichiometric amount of monomethylamine at a temperature of from −80° C. to 40° C., and isolating the resulting product.

2. The process of producing a polymer containing sulfur and nitrogen which comprises contacting sulfur dichloride with a stoichiometric amount of monomethylamine at a temperature of from −80° C. to 40° C., and isolating the resulting product.

3. The process of producing a polymer containing sulfur and nitrogen which comprises contacting sulfur dichloride with at least a 3 molar proportion of monomethylamine at a temperature of −80° C. to 40° C., and isolating the resulting product.

4. A linear polymer having the structure:

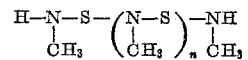

in which $n$ is an integer having a value of at least 4.

References Cited in the file of this patent
UNITED STATES PATENTS

| | | |
|---|---|---|
| 2,209,976 | James | Aug. 6, 1940 |
| 2,218,447 | Badertscher et al. | Oct. 17, 1940 |
| 2,259,164 | Jones | Oct. 14, 1941 |
| 2,356,170 | Mathes et al. | Aug. 22, 1944 |
| 2,417,954 | Sloan | Mar. 25, 1947 |
| 2,468,159 | Barton | Apr. 26, 1949 |

OTHER REFERENCES

Lengfeld et al.: Ber. Deut. Chem., vol 28, pp. 2742–44 (1895).